(12) United States Patent
Ling et al.

(10) Patent No.: US 12,424,614 B2
(45) Date of Patent: Sep. 23, 2025

(54) POSITIVE ELECTRODE PLATE, NEGATIVE ELECTRODE PLATE, BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventors: Yangfang Ling, Ningde (CN); Shaocong Ouyang, Ningde (CN); Xiao Chen, Ningde (CN); Ziyi Yin, Ningde (CN); Huanji Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/029,492

(22) Filed: Jan. 17, 2025

(65) Prior Publication Data
US 2025/0167207 A1    May 22, 2025

Related U.S. Application Data

(63) Continuation of application No. PCT/CN2023/072808, filed on Jan. 18, 2023.

(51) Int. Cl.
*H01M 4/136* (2010.01)
*H01M 4/02* (2006.01)
(Continued)

(52) U.S. Cl.
CPC ........... *H01M 4/136* (2013.01); *H01M 4/131* (2013.01); *H01M 4/661* (2013.01);
(Continued)

(58) Field of Classification Search
None
See application file for complete search history.

(56) References Cited

U.S. PATENT DOCUMENTS

| 8,142,928 B2 * | 3/2012 | Blomgren | H01M 4/661 |
| | | | 429/211 |
| 2007/0154809 A1 * | 7/2007 | Wu | H01M 10/052 |
| | | | 429/231.95 |
| 2016/0372798 A1 | 12/2016 | Ishii | |

FOREIGN PATENT DOCUMENTS

| CN | 110085920 A | * | 8/2019 | .......... H01M 10/058 |
| CN | 113675541 A | | 11/2021 | |

(Continued)

OTHER PUBLICATIONS

Machine Translation of CN-110085920-A (Year: 2019).*
(Continued)

*Primary Examiner* — Gregg Cantelmo
(74) *Attorney, Agent, or Firm* — K&L Gates LLP

(57) ABSTRACT

This application provides a positive electrode plate, a negative electrode plate, a battery cell, a battery, and an electric apparatus. An electrode plate includes a current collector and an active material layer, where the current collector includes a body portion and a tab. A ratio of the product of a cross-sectional area of a root of each tab and a conductivity of the current collector to a length between central axes of two adjacent tabs to the product of a width of the active material layer and a mass per unit area of the active material layer satisfies that a design factor of a positive tab is at least 0.1 and a design factor of a negative tab is at least 0.02.

18 Claims, 4 Drawing Sheets

(51) Int. Cl.
  *H01M 4/131*     (2010.01)
  *H01M 4/1391*    (2010.01)
  *H01M 4/1397*    (2010.01)
  *H01M 4/66*      (2006.01)
  *H01M 10/0525*   (2010.01)
  *H01M 50/209*    (2021.01)

(52) U.S. Cl.
  CPC ..... *H01M 10/0525* (2013.01); *H01M 50/209* (2021.01); *H01M 2004/021* (2013.01); *H01M 2004/027* (2013.01); *H01M 2004/028* (2013.01); *H01M 4/1391* (2013.01); *H01M 4/1397* (2013.01); *H01M 2220/20* (2013.01)

(56) References Cited

FOREIGN PATENT DOCUMENTS

| | | |
|---|---|---|
| CN | 114497434 A | 5/2022 |
| CN | 216903255 U | 7/2022 |
| CN | 217009337 U | 7/2022 |
| CN | 114976512 A | 8/2022 |
| CN | 115000345 A | 9/2022 |
| EP | 3736884 A1 * | 11/2020 ........ H01M 10/0587 |

OTHER PUBLICATIONS

International Search Report in the international application No. PCT/CN2023/072808, mailed on Jun. 23, 2023. 5 pages.
Written Opinion of the International Search Authority in the international application No. PCT/CN2023/072808, mailed on Jun. 23, 2023. 6 pages.

\* cited by examiner

B-B

POSITIVE ELECTRODE PLATE, NEGATIVE ELECTRODE PLATE, BATTERY CELL, BATTERY, AND ELECTRIC APPARATUS

CROSS-REFERENCE TO RELATED APPLICATION

This application is a continuation application of the PCT Application PCT/CN2023/072808 filed on Jan. 18, 2023, which is incorporated herein by reference in the entirety.

TECHNICAL FIELD

This application relates to the field of batteries, and specifically to a positive electrode plate, a negative electrode plate, a battery cell, a battery, and an electric apparatus.

BACKGROUND

With the advantages such as high working voltage, wide application temperature range, and low self-discharge rate, secondary batteries have been widely used in the fields such as mobile electronic devices, household appliances, and electric vehicles. With continuous development of products using secondary batteries, higher requirements have also been imposed on the capacity, energy density, charge/discharge rate, and cycling stability of secondary batteries in various fields.

SUMMARY

In view of the foregoing problem, this application provides a positive electrode plate, a negative electrode plate, a battery cell, a battery, and an electric apparatus, which can provide a reasonable adjustment range for a size of a tab and layout distribution of the tab in an electrode plate while increasing the volumetric energy density of the battery cell and ensuring that an internal temperature of the battery cell does not exceed a threshold.

According to a first aspect, this application provides a positive electrode plate, including a positive current collector and a positive active material layer disposed on at least one side of the positive current collector, where the positive current collector includes a positive body portion and at least one positive tab disposed at one end of the positive body portion.

A width of a root of each positive tab along an MD direction is m1, measured in mm; a thickness of the root of each positive tab is d1, measured in mm; along the MD direction, a distance between central axes of two adjacent positive tabs is b1, measured in mm; a conductivity of the positive current collector is S1, measured in S/m; a width of the positive active material layer along a TD direction is a1, measured in mm; and a mass per unit area of the positive active material layer is CW1, measured in g/1540.25 mm².

A design parameter of each positive tab is Fc, where $$Fc = \frac{m1 \times d1 \times S1}{CW1 \times a1 \times b1},$$

measured in 15.4025S·mm·g⁻¹, and a value of Fc satisfies Fc≥0.1.

In the technical solution of this embodiment of this application, size specifications of each positive tab and the design of a distance between adjacent positive tabs are adjusted according to the design parameter of each positive tab, ensuring that the battery cell has a current carrying capability matching with the volumetric energy density on the premise of increasing the volumetric energy density of the battery cell, thereby ensuring that a local temperature rise of the corresponding battery cell in a fixed charging process does not exceed a threshold.

In some embodiments, the value of the design parameter of each positive tab satisfies Fc≥0.4.

In the technical solution of these embodiments of this application, the design parameter of each positive tab is further optimized, ensuring that the design of the positive tab ensures that a local temperature rise of the battery cell in a fixed charging process does not exceed a threshold while ensuring that the volumetric energy density of the battery cell reaches a certain level.

In some embodiments, a ratio of the mass per unit area of the positive active material layer to the thickness of the positive current collector is taken as a positive electrode plate factor, and a value of the positive electrode plate factor satisfies 17≤φc≤50, where φc represents the positive electrode plate factor, measured in g/1540.25 mm³.

In the technical solution of these embodiments of this application, the value of the positive electrode plate factor is limited to ensure that the positive current collector 110 is maintained above a certain strength without problems such as plate breakage caused by cold pressing and internal brittle fracture of the battery cell, and also to control the mass per unit area of the positive active material layer within a certain value range without the problems such as serious coating cracking, poor weight distribution uniformity and easy demolding of the electrode plate, thereby ensuring the manufacturing efficiency and cost advantage of the battery cell.

In some embodiments, m1≥0.02 mm; and/or d1≤0.02 mm; and/or b1≤0.6 mm; and/or S1≥30 S/m; and/or a1≤0.3 mm; and/or 0.35 g/1540.25 mm²≤CW1≤0.5 g/1540.25 mm².

In the technical solution of these embodiments of this application, value ranges of various parameters of the positive tab, the positive active material layer and the positive current collector are determined, and within the above value ranges, the stability of product performance of the battery cell is ensured.

In some embodiments, the positive active material layer includes a lithium iron phosphate material.

In the technical solution of these embodiments of this application, the positive tab of the lithium iron phosphate secondary battery is designed, which can effectively increase the volumetric energy density of the battery cell to 300 Wh/L, thereby ensuring that a local temperature rise of the battery cell in a fixed charging process does not exceed 60° C.

According to a second aspect, this application provides a negative electrode plate, including a negative current collector and a negative active material layer disposed on at least one side of the negative current collector, where the negative current collector includes a negative body portion and at least one negative tab disposed at one end of the negative body portion.

A width of a root of each negative tab along the MD direction is m2, measured in mm; a thickness of the root of each negative tab is d2, measured in mm; along the MD direction, a distance between central axes of two adjacent negative tabs is b2, measured in mm; a conductivity of the negative current collector is S2, measured in S/m; a width of the negative active material layer along a TD direction is a2, measured in mm; and a mass per unit area of the negative active material layer is CW2, measured in g/1540.25 mm².

A design parameter of each negative tab is Fa, where $$Fa = \frac{m2 \times d2 \times S2}{CW2 \times a2 \times b2},$$

measured in 15.4025S·mm·g$^{-1}$, and a value of Fa satisfies Fa≥0.02.

In the technical solution of this embodiment of this application, size specifications of each negative tab and the design of a distance between adjacent negative tabs are adjusted according to the design parameter of each negative tab, ensuring that the battery cell has a current carrying capability matching with the volumetric energy density on the premise of increasing the volumetric energy density of the battery cell, thereby ensuring that a local temperature rise of the corresponding battery cell in a fixed charging process does not exceed a threshold.

In some embodiments, the value of the design parameter of each negative tab satisfies Fa≥0.1.

In the technical solution of these embodiments of this application, the design parameter of each negative tab is further optimized, ensuring that the design of the positive tab ensures that a local temperature rise of the battery cell in a fixed charging process does not exceed a threshold while ensuring that the volumetric energy density of the battery cell reaches a certain level.

In some embodiments, a ratio of the mass per unit area of the negative active material layer to the thickness of the negative current collector is taken as a negative electrode plate factor, and a value of the negative electrode plate factor satisfies 15≤φa≤85, where φa represents the negative electrode plate factor, measured in g/1540.25 mm$^3$.

In the technical solution of these embodiments of this application, the value of the negative electrode plate factor is limited to ensure that the negative current collector is maintained above a certain strength without problems such as plate breakage caused by cold pressing and internal brittle fracture of the battery cell, and also to control the mass per unit area of the negative active material layer within a certain value range without the problems such as serious coating cracking, poor weight distribution uniformity and easy demolding of the electrode plate, thereby ensuring the manufacturing efficiency and cost advantage of the battery cell.

In some embodiments, 0.02 mm≤m2≤0.2 mm; and/or 0.003 mm≤d2≤0.01 mm; and/or 0.1 mm≤b2≤0.6 mm; and/or 50 S/m≤S2≤70 S/m; and/or 0.05 mm≤a2≤0.3 mm; and/or 0.15 g/1540.25 mm$^2$≤CW2≤0.25 g/1540.25 mm$^2$.

Through experiments, the applicant of this disclosure has determined the above value ranges of various parameters of the negative tab, the negative active material layer and the negative current collector on the premise of increasing the volumetric energy density of the battery cell and ensuring that a local temperature rise of the battery cell in a fixed charging process does not exceed a threshold; and within the above value ranges, the stability of product performance of the battery cell is ensured.

According to a third aspect, this application provides a battery cell, including the foregoing positive electrode plate and/or the foregoing negative electrode plate.

The value of the design parameter of each positive tab satisfies Fc≥0.1; and/or the value of the design parameter of each negative tab satisfies Fa≥0.02.

In the technical solution of this embodiment of this application, size specifications of each positive tab and each negative tab as well as a distribution design of the positive tab in the positive electrode plate and a distribution design of the negative tab in the negative electrode plate are adjusted according to the design parameters of each positive tab and each negative tab, thereby ensuring that a local temperature rise of the battery cell in a fixed charging process does not exceed a threshold on the premise of increasing the volumetric energy density of the battery cell.

In some embodiments, 0.4≤Fc≤75, 0.1≤Fa≤180; and 17≤φc≤50, 15≤φa≤85; and m1>0.02 mm; d1≤0.02 mm, b1≤0.6 mm; S1≥30 S/m; a1≤0.3 mm; and/or 0.35 g/1540.25 mm$^2$≤CW1≤0.5 g/1540.25 mm$^2$; and 0.02 mm≤m2<0.2 mm; 0.003 mm ≤d2≤0.01 mm; 0.1 mm≤b2≤0.6 mm; 50 S/m≤S2≤70S/m; 0.05 mm≤a2≤0.3 mm; 0.15 g/1540.25 mm$^2$≤CW2≤0.25 g/1540.25 mm$^2$.

In the technical solution of these embodiments of this application, further preferable value ranges of various parameters of the positive tab, the positive active material layer, the positive current collector, the negative tab, the negative active material layer, and the negative current collector are provided, and within the above value ranges, the stability of product performance of the battery cell is ensured.

In some embodiments, the battery cell is a lithium iron phosphate secondary battery, where a volumetric energy density of the battery cell is ≥300 Wh/L, and after the battery cell is charged at a rate of 3 C at a room temperature for 6 min, maximum temperatures of the root of the positive tab and the root of the negative tab of the battery cell are ≤60° C.

In the technical solution of these embodiments of this application, the positive tab and the negative tab of the lithium iron phosphate secondary battery are designed, which can effectively increase the volumetric energy density of the battery cell to 300 Wh/L, thereby ensuring that a local temperature rise of the battery cell in a fixed charging process does not exceed 60° C.

According to a fourth solution, this application provides a battery, including a box and a plurality of battery cells as described above, where the battery cells are located in the box.

According to a fifth solution, this application provides an electric apparatus, including the foregoing battery.

The foregoing description is merely an overview of the technical solutions of this application. The following describes specific embodiments of this application illustratively to enable a clearer understanding of the technical solutions of this application, enable implementation of the technical solutions based on the content of the specification, and make the foregoing and other objectives, features, and advantages of this application more evident and comprehensible.

BRIEF DESCRIPTION OF DRAWINGS

A person of ordinary skill in the art can clearly understand various other advantages and benefits by reading the detailed description of the optional embodiments below. The accompanying drawings are merely intended to illustrate the optional embodiments, but are not construed as a limitation on this application. Throughout all the accompanying drawings, same components are denoted by same reference signs. In the accompanying drawings.

Figure 1:
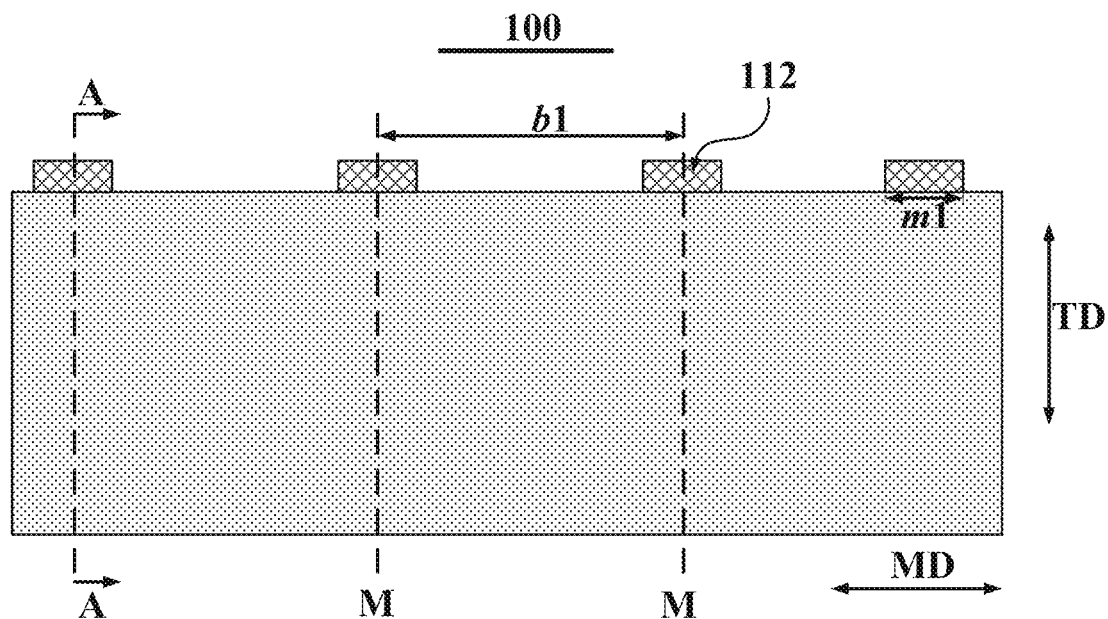
FIG. 1 is a schematic structural diagram of a positive electrode plate provided in some embodiments of this application.

Reference numerals and corresponding terms: 100. positive electrode plate; 110. positive current collector; 120. positive active material layer; 111. positive body portion; 112. positive tab; M. central axis of positive tab; 200. negative electrode plate; 210. negative current collector; 220. negative active material layer; 211. negative body portion; 212. negative tab; N. central axis of negative tab; 300. battery cell; 400. box; 500. battery; 600. electric vehicle; 601. controller; and 602. motor.

DETAILED DESCRIPTION OF EMBODIMENTS

Embodiments of the technical solution of this application are described in detail below in conjunction with the accompanying drawings. The following embodiments are only used to more clearly illustrate the technical solution of this application, and therefore, are merely examples and cannot be used to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the terms "first", "second", and the like are merely intended to distinguish between different objects, and shall not be understood as any indication or implication of relative importance or any implicit indication of the number, particular sequence or primary-secondary relationship of the technical features indicated. In the descriptions of the embodiments of this application, "a plurality of" means two or more, unless otherwise specifically defined.

Reference to "embodiments" in this specification means that particular features, structures, or characteristics described with reference to the embodiments may be included in at least one embodiment of this application. Occurrence of the phrase in various places in this specification does not necessarily refer to the same embodiment, nor is an independent or alternative embodiment that is mutually exclusive with other embodiments. It is understood explicitly and implicitly by a person skilled in the art that the embodiments described in this specification may be combined with other embodiments.

In the description of the embodiments of this application, the term "and/or" describes only an association relationship between associated objects and represents that three relationships may exist. For example, A and/or B may represent the following three cases: only A exists, both A and B exist, and only B exists. In addition, the character "/" in this specification generally indicates an "or" relationship between the associated objects.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the descriptions of the embodiments of this application, unless otherwise specified and defined explicitly, the technical terms "mounting", "connection", "join", and "fastening" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. A person of ordinary skill in the art can understand specific meanings of these terms in the embodiments of this application as appropriate to specific situations.

The applicant of this disclosure has noted that: in battery cells with the same chemical system, a larger positive coating weight (coating weight, CW) results in a higher volumetric energy density of the battery cells under a condition that a total length and a separator width of an electrode plate are kept unchanged. Taking a lithium iron phosphate secondary battery as an example, a positive coating weight above $0.35$ g·$1540.25$ mm$^{-2}$ can be regarded as thick coating. A volumetric energy density of the battery cell corresponding to thick coating may be 300 Wh/L or higher.

Compared with a battery cell corresponding to thin coating, the battery cell corresponding to thick coating has larger charge and discharge currents at the same rate, so a higher requirement is imposed on the current carrying capability of the battery cell. The current carrying capability of the battery cell represents the capability of the battery cell for allowing current to pass through. If the current carrying capability of each battery cell cannot match the increase in the positive coating weight, the temperature in this battery cell is likely to rise and once it exceeds a certain temperature threshold, a large amount of heat is generated in this battery cell. The heat causes a continuous rise of the internal temperature of battery cells and is transferred mutually, leading to a chain reaction among a plurality of battery cells in a whole battery, and thus causing serious safety accidents.

Specifically, an internal temperature threshold of the battery cell should not exceed 60° C. This is because when the internal temperature of the battery cell exceeds 60° C., a solid electrolyte interface (SEI) of a positive active material layer thereof starts to be decomposed, causing sharp performance deterioration of the battery cell. Therefore, the internal temperature of the battery cell should be controlled below 60° C.

Further, The applicant of this disclosure has found that a tab design of an electrode plate directly affects the current carrying capability of the battery cell. For example, if the battery cell adopts a thick coating solution and the tab solution remains unchanged, in a same charge/discharge process, a thickly coated battery cell has a lower current carrying capability and more Joule heat at the tab, and when a local temperature at the root of the tab exceeds a temperature threshold, battery performance deterioration is accelerated. Under this condition, temperature rise can be reduced by reducing a charging rate, but the fast-charging performance of the battery is reduced accordingly.

In view of the above consideration, to solve the problem of improving the current carrying capability of the battery cell and ensuring the safety and stability of the performance of the battery cell on the premise of improving the volumetric energy density of the battery cell, The applicant of this disclosure has proposed a tab design method through in-depth research, where the corresponding current carrying capability of a single tab is adjusted by designing the width and thickness of the root of each tab and a distance between adjacent tabs, so that the design of the tab matches a coating thickness of an active material, thereby effectively controlling the internal temperature of the battery cell without sacrificing the fast charging performance of the battery cell.

The technical solutions described in the embodiments of this application are applicable to positive electrode plates, negative electrode pates, battery cells, batteries, and electric apparatuses. The battery cell disclosed in this application can be applied to lithium-ion secondary batteries and can also applied to other energy storage batteries. This is not limited in this application.

The following makes a detailed description of this application with reference to the accompanying drawings and embodiments.

Figure 2:
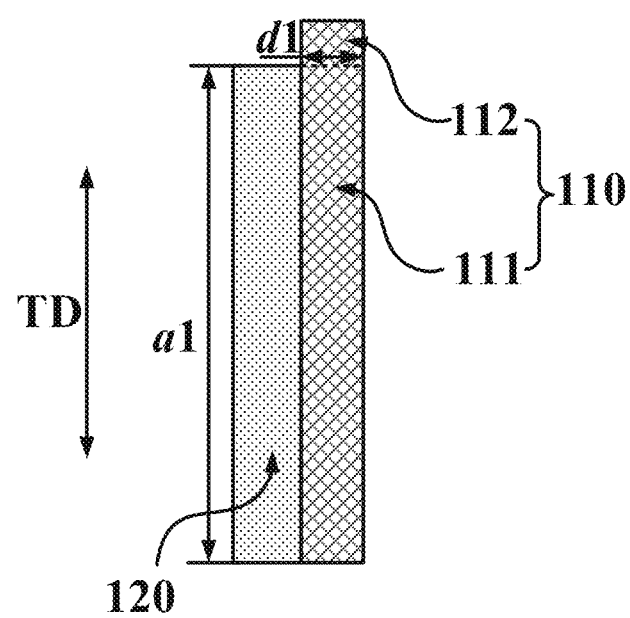
FIG. 2 is a schematic structural diagram of a cross section of the positive electrode plate provided in FIG. 1 along a line A-A.

Reference is made to FIG. 1 and FIG. 2, where FIG. 1 is a schematic structural diagram of a positive electrode plate provided in this application, and FIG. 2 is a schematic structural diagram of a cross section of the positive electrode plate provided in FIG. 1 along a line A-A.

Referring to FIG. 1 and FIG. 2, this application provides a positive electrode plate 100, including a positive current collector 110 and a positive active material layer 120 disposed on at least one side of the positive current collector 110. The positive current collector 110 includes a positive body portion 111 and at least one positive tab 112 disposed at one end of the positive body portion 111.

A width of a root of each positive tab 112 along an MD direction is m1, measured in mm. A thickness of the root of each positive tab 112 is d1, measured in mm. Along the MD direction, a distance between central axes M of two adjacent positive tabs is b1, measured in mm. A conductivity of the positive current collector 110 is S1, measured in S/m. A width of the positive active material layer 120 along a TD direction is a1, measured in mm. A mass per unit area of the positive active material layer 120 is CW1, measured in g/1540.25 mm².

A design parameter of each positive tab 112 is Fc, where $$Fc = \frac{m1 \times d1 \times S1}{CW1 \times a1 \times b1},$$

measured in 15.4025S·mm·g$^{-1}$, and a value of Fc satisfies Fc≥0.1.

In this application, the positive electrode plate 100 includes the positive current collector 110 and the positive active material layer 120. The positive current collector 110 is typically made of a metal material. Taking a lithium-ion battery as an example, the positive current collector 110 may be an aluminum foil. The positive active material layer 120 is applied onto at least one side of the positive current collector 110. Taking a lithium-ion battery as an example, the positive active material layer 120 may be made of a material of lithium cobaltate, lithium iron phosphate, ternary lithium, lithium manganate, or the like. The positive active material layer 120 may be disposed on one side of the positive current collector 110 or disposed on two sides of the positive current collector 110.

The positive body portion 111 is a part, that is coated with the positive active material layer 120, of the positive current collector 110. The positive tab 112 is a part, that protrudes from the positive body portion 111, of the positive current collector 110. The positive tab 112 may be disposed at one end of the positive body portion 111 or disposed at two ends of the positive body portion 111. One end of the positive body portion 111 may be provided with one positive tab 112 or provided with a plurality of positive tabs 112 that are laminated. The number of the positive tabs 112 in this application can be adjusted as required. The central axis M of the positive tab represents a line connecting centers of the cross sections of the positive tab 112. In one or more embodiments of this application, the distance b1 between the central axes M of two adjacent positive tabs along the MD direction is measured by the following method. First, the central axes M of two target positive tabs are determined using a precise measuring tool, and then the distance b1 between the central axes M of the two target positive tabs is measured using the premise measuring tool. In one or more embodiments of this application, a laser rangefinder is used as the premise measuring tool.

The root of each positive tab 112 represents a part, that is connected to the positive body portion 111, of the positive tab 112. In one or more embodiments of this application, a length of the root of each positive tab 112 along the TD direction accounts for less than 50% of a length of each positive tab 112 along the TD direction. Specifically, the length of the root of each positive tab 112 along the TD direction accounts for less than 40%, 30%, 20%, or 10% of the length of each positive tab 112 along the TD direction, which is reasonably set as required. The TD direction (Transverse Direction) represents a width direction of the electrode plate. A length direction of the electrode plate is perpendicular to the TD direction, which is an MD direction (Machine Direction). In a thickly coated positive electrode plate 100 with certain parameters, a cross-sectional area of the root of each positive tab 112, a coating weight of the positive active material layer corresponding to each positive tab 112, and the like can be adjusted to a reasonable range based on the design parameter of each positive tab 112, ensuring that the local temperature rise of the battery cell in a fixed charging process does not exceed a threshold.

In the calculation formula of the design parameter Fc of each positive tab 112, in the numerator, m1×d1 represents the cross-sectional area of the root of the positive tab 112, and m1×d1×S1 represents the current carrying capability of each positive tab 112; and in the denominator, CW1×a1×b1 represents a current carrying capacity which each positive tab 112 needs to bear. A lower limit of Fc corresponds to a critical point at which each positive tab 112 has the smallest current carrying capability and bears the largest current carrying capacity. The setting of the lower limit of Fc ensures that the temperature rise at the root of the positive tab 112 does not exceed 60° C.

In these embodiments of this application, size specifications of each positive tab 112 and the design of a distance between adjacent positive tabs 112 are adjusted according to the design parameter of each positive tab 112, ensuring that the battery cell has a current carrying capability matching with the volumetric energy density on the premise of increasing the volumetric energy density of the battery cell, thereby ensuring that a local temperature rise of the corresponding battery cell in a fixed charging process does not exceed a threshold.

In some embodiments, the value of the design parameter of each positive tab 112 satisfies Fc≥0.4.

In these embodiments, a lower limit of the value of the design parameter of each positive tab 112 represents that the current carrying capacity which each positive tab 112 bears has a certain threshold. If the value of the design parameter of each positive tab 112 exceeds the lower limit, each positive tab 112 bears an excessively large current carrying capacity and excessively small current carrying capability, joule heat at the root of the positive tab 112 is increased, and the temperature at the root of the positive tab 112 exceeds the temperature threshold, causing rapid performance deterioration of the battery cell. An upper limit of the value of the design parameter of each positive tab 112 corresponds to a critical point at which the current carrying capacity is the largest and the current carrying capacity is the smallest, mainly ensuring that the design of each positive tab 112 can satisfy the fast charging capability of the battery cell.

In these embodiments, the design parameter of each positive tab 112 is further optimized, ensuring that the design of the positive tab 112 ensures that a local temperature rise of the battery cell in a fixed charging process does not exceed a threshold while ensuring that the volumetric energy density of the battery cell reaches a certain level.

In some embodiments, a ratio of the mass per unit area of the positive active material layer 120 to the thickness of the positive current collector 110 is taken as a positive electrode plate factor, and a value of the positive electrode plate factor satisfies 17≤φc≤50, where φc represents the positive electrode plate factor, measured in g/1540.25 mm³.

In this application, the positive electrode plate factor represents a variable of the design parameter of each positive tab 112. The positive electrode plate factor indicates that the mass per unit area of the positive active material layer 120 has a correlation with the thickness of the positive current collector 110, and the two are not two independent variables and cannot each take an arbitrary value.

In these embodiments, the lower limit of the value of the positive electrode plate factor corresponds to a critical point at which the positive active material layer 120 has the smallest mass per unit area and the positive current collector 110 has the largest thickness, mainly ensuring that the volumetric energy density of the battery cell can reach a certain numerical value. The upper limit of the value of the positive electrode plate factor corresponds to a critical point at which the positive active material layer 120 has the largest mass per unit area and the positive current collector 110 has the smallest thickness.

In these embodiments, the value of the positive electrode plate factor is limited to ensure that the positive current collector 110 is maintained above a certain strength without problems such as plate breakage caused by cold pressing and internal brittle fracture of the battery cell, and also to control the mass per unit area of the positive active material layer 120 within a certain value range without the problems such as serious coating cracking, poor weight distribution uniformity and easy demolding of the electrode plate, thereby ensuring the manufacturing efficiency and cost advantage of the battery cell. Within the value range, a larger positive electrode plate factor indicates thicker coating and higher volumetric energy density of the battery cell.

In some embodiments, m1≥0.02 mm; and/or d1≤0.02 mm; and/or b1≤0.6 mm; and/or S1≥30 S/m; and/or a1≤0.3 mm; and/or 0.35 g/1540.25 mm²≤CW1≤0.5 g/1540.25 mm².

Through experiments, The applicant of this disclosure determines the value ranges of various parameters of the positive tab 112, the positive active material layer 120 and the positive current collector 110 on the premise of increasing the volumetric energy density (such as 300 Wh/L) of the battery cell and ensuring that a local temperature rise of the battery cell in a fixed charging process does not exceed a threshold (such as 60° C.); and within the above value ranges, the stability of product performance of the battery cell is ensured.

In some embodiments, the positive active material layer 120 includes a lithium iron phosphate material. In the above technical solution of these embodiments, the positive tab 112 of the lithium iron phosphate secondary battery is designed, which can effectively increase the volumetric energy density of the battery cell to 300 Wh/L, thereby ensuring that a local temperature rise of the battery cell in a fixed charging process does not exceed 60° C.

Figure 3:
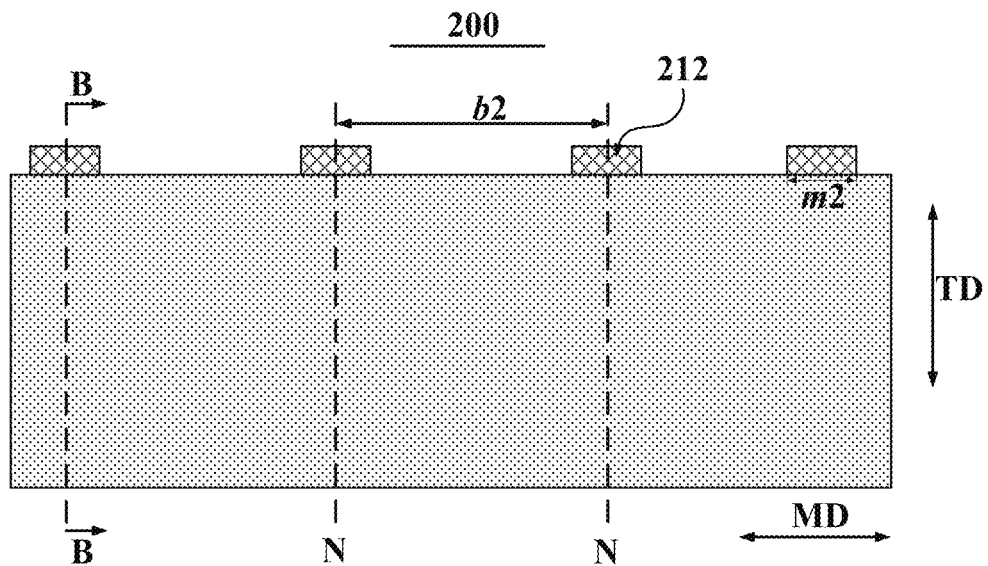
FIG. 3 is a schematic structural diagram of a negative electrode plate provided in some embodiments of this application.
Figure 4:
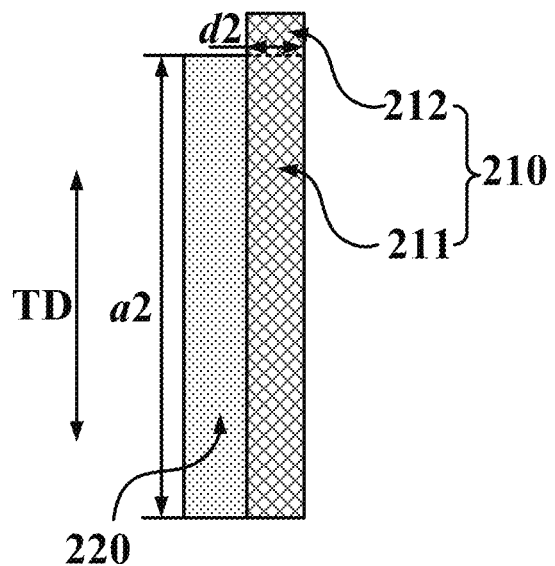
FIG. 4 is a schematic structural diagram of a cross section of the negative electrode plate provided in FIG. 3 along a line B-B.

Reference is made to FIG. 3 and FIG. 4, where FIG. 3 is a schematic structural diagram of a negative electrode plate provided in this application, and FIG. 4 is a schematic structural diagram of a cross section of the negative electrode plate provided in FIG. 3 along a line B-B.

Referring to FIG. 3 and FIG. 4, this application provides a negative electrode plate 200, including a negative current collector 210 and a negative active material layer 220 disposed on at least one side of the negative current collector 210. The negative current collector 210 includes a negative body portion 211 and at least one negative tab 212 disposed at one end of the negative body portion 211.

A width of a root of each negative tab 212 along an MD direction is m2, measured in mm. A thickness of the root of each negative tab 212 is d2, measured in mm. Along the MD direction, a distance between central axes N of two adjacent negative tabs is b2, measured in mm. A conductivity of the negative current collector 210 is S2, measured in S/m. A width of the negative active material layer 220 along a TD direction is a2, measured in mm. A mass per unit area of the negative active material layer 220 is CW2, measured in g/1540.25 mm².

A design parameter of each negative tab 212 is Fa, where $$Fa = \frac{m2 \times d2 \times S2}{CW2 \times a2 \times b2},$$

measured in 15.4025S·mm·g$^{-1}$. A value of Fa satisfies Fa≥0.02.

In this application, the negative electrode plate 200 includes the negative current collector 210 and the negative active material layer 220. The negative current collector 210 is typically made of a metal material. Taking a lithium-ion battery as an example, the negative current collector 210 may be a copper foil. The negative active material layer 220 is applied onto at least one side of the negative current collector 210. Taking a lithium-ion battery as an example, the negative active material layer 220 may be made of a carbon or silicon material. The negative active material layer 220 may be disposed on only one side of the negative current collector 210 or disposed on two sides of the negative current collector 210.

The negative body portion 211 is a part, that is coated with the negative active material layer 220, of the negative current collector 210. The negative tab 212 is part, that protrudes from the negative body portion 211, of the negative current collector 210. The negative tab 212 may be disposed at only one end of the negative body portion 211 or disposed at two ends of the negative body portion 211. One end of the negative body portion 211 may be provided with only one negative tab 212 or provided with a plurality of negative tabs 212 that are laminated. The number of the negative tabs 212 in this application can be adjusted as required. The central axis N of the negative tab represents a line connecting centers of the cross sections of the negative tab 212. In one or more embodiments of this application, the distance b2 between the central axes N of two adjacent negative tabs along the MD direction is measured by the following method. First, the central axes N of two target negative tabs are determined using a precise measuring tool, and then the distance b2 between the central axes N of the two target negative tabs is measured using the premise measuring tool. In one or more embodiments of this application, a laser rangefinder is used as the premise measuring tool.

The root of each negative tab 212 represents a part, that is connected to the negative body portion 211, of the negative tab 212. In one or more embodiments of this application, a length of the root of each negative tab 212 along the TD direction accounts for less than 50% of a length of each negative tab 212 along the TD direction. Specifically, the length of the root of each negative tab 212 along the TD direction accounts for less than 40%, 30%, 20%, or 10% of the length of each negative tab 212 along the TD direction, which is reasonably set as required. In a thickly coated negative electrode plate 200 with certain parameters, a cross-sectional area of the root of each negative tab 212, a coating weight of the negative active material layer corresponding to each negative tab 212, and the like can be adjusted to a reasonable range based on the design parameter of each negative tab 212, ensuring that the local temperature rise of the battery cell in a fixed charging process does not exceed a threshold.

In the calculation formula of the design parameter Fa of each negative tab 212, in the numerator, m2×d2 represents the cross-sectional area of the root of the negative tab 212, and m2×d2× S2 represents the current carrying capability of each negative tab 212; and in the denominator, CW2×a2×b2 represents a current carrying capacity which each negative tab 212 needs to bear. A lower limit of Fa corresponds to a critical point at which each negative tab 212 has the smallest current carrying capability and bears the largest current carrying capacity, mainly ensuring that the temperature rise at the root of the negative tab 212 does not exceed 60° C.

In these embodiments of this application, size specifications of each negative tab 212 and the design of a distance between adjacent negative tabs 212 are adjusted according to the design parameter of each negative tab 212, ensuring that the battery cell has a current carrying capability matching with the volumetric energy density on the premise of increasing the volumetric energy density of the battery cell, thereby ensuring that a local temperature rise of the corresponding battery cell in a fixed charging process does not exceed a threshold.

In some embodiments, the value of the design parameter of each negative tab 212 satisfies Fa≥0.1.

In these embodiments, a lower limit of the value of the design parameter of each negative tab 212 represents that the current carrying capacity which each negative tab 212 bears has a certain threshold. If the value of the design parameter of each negative tab 212 exceeds the lower limit, each negative tab 212 bears an excessively large current carrying capacity but excessively small current carrying capability, joule heat at the root of the negative tab 212 is increased, and the temperature at the root of the negative tab 212 exceeds the temperature threshold, causing rapid performance deterioration of the battery cell. An upper limit of the value of the design parameter of each negative tab 212 corresponds to a critical point at which the current carrying capability is the largest and the current carrying capacity is the smallest, mainly ensuring that the design of each negative tab 212 can satisfy the fast-charging capability of the battery cell.

In these embodiments, the design parameter of each negative tab 212 is further optimized, ensuring that the design of the negative tab 212 ensures that a local temperature rise of the battery cell in a fixed charging process does not exceed a threshold while ensuring that the volumetric energy density of the battery cell reaches a certain level.

In some embodiments, a ratio of the mass per unit area of the negative active material layer 220 to the thickness of the negative current collector 210 is taken as a negative electrode plate factor, and a value of the negative electrode plate factor satisfies 15≤φa≤85, where φa represents the negative electrode plate factor, measured in g/1540.25 mm$^3$.

In this application, the negative electrode plate factor represents a variable of the design parameter of each negative tab 212. The negative electrode plate factor indicates that the mass per unit area of the negative active material layer 220 has a correlation with the thickness of the negative current collector 210, and the two are not two independent variables and cannot each take an arbitrary value.

In these embodiments, a lower limit of the value of the negative electrode plate factor corresponds to a critical point at which the negative active material layer 220 has the smallest mass per unit area and the negative current collector 210 has the largest thickness, mainly ensuring that the volumetric energy density of the battery cell can reach a certain numerical value. An upper limit of the value of the negative electrode plate factor corresponds to a critical point at which the negative active material layer 220 has the largest mass per unit area and the negative current collector 210 has the smallest thickness.

In these embodiments, the value of the negative electrode plate factor is limited to ensure that the negative current collector 210 is maintained above a certain strength without problems such as plate breakage caused by cold pressing and internal brittle fracture of the battery cell, and also to control the mass per unit area of the negative active material layer 220 within a certain value range without the problems such as serious coating cracking, poor weight distribution uniformity and easy demolding of the electrode plate, thereby ensuring the manufacturing efficiency and cost advantage of the battery cell. Within the value range, a larger negative electrode plate factor indicates thicker coating and higher volumetric energy density of the battery cell.

In some embodiments, 0.02 mm≤m2≤0.2 mm; and/or 0.003 mm≤d2≤0.01 mm; and/or 0.1 mm≤b2≤0.6 mm; and/or 50 S/m≤S2≤70 S/m; and/or 0.05 mm≤a2≤0.3 mm; and/or 0.15 g/1540.25 mm²≤CW2≤0.25 g/1540.25 mm².

Through experiments, The applicant of this disclosure determines the value ranges of various parameters of the negative tab 212, the negative active material layer 220 and the negative current collector 210 on the premise of increasing the volumetric energy density (such as 300 Wh/L) of the battery cell and ensuring that a local temperature rise of the battery cell in a fixed charging process does not exceed a threshold (such as 60° C.); and within the above value ranges, the stability of product performance of the battery cell is ensured.

Figure 5:
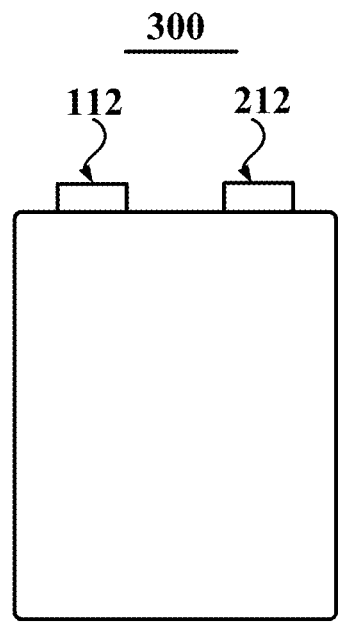
FIG. 5 is a schematic structural diagram of a battery cell provided in some embodiments of this application.
Figure 6:
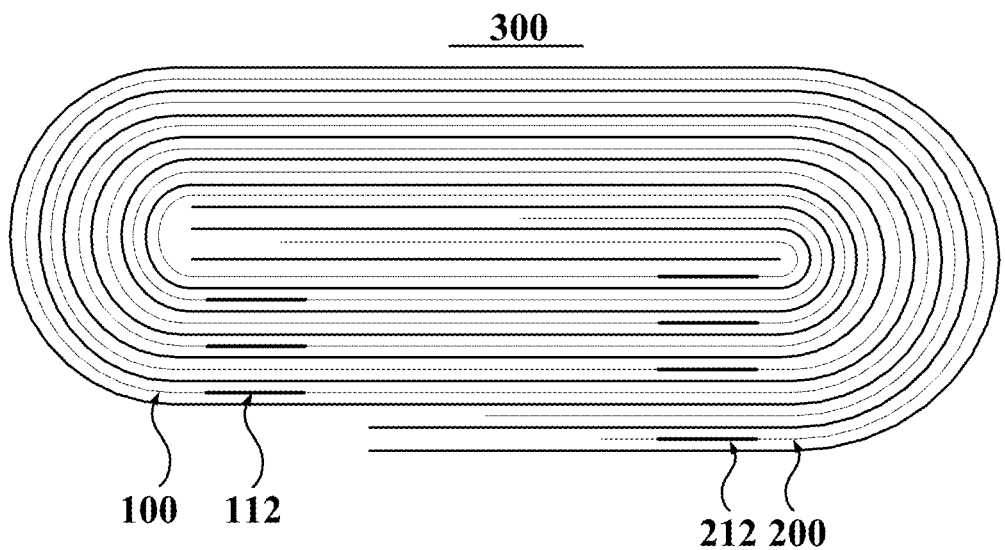
FIG. 6 is a schematic structural top view of the battery cell provided in FIG. 5.

Reference is made to FIG. 5 and FIG. 6, where FIG. 5 is a schematic structural diagram of a battery cell provided in this application, and FIG. 6 is a schematic structural top view of the battery cell provided in FIG. 5.

Referring to FIG. 5 and FIG. 6, this application provides a battery cell 300, including a positive electrode plate 100 and/or a negative electrode plate 200. With reference to FIG. 1 and FIG. 2, the positive electrode plate 100 includes a positive current collector 110 and a positive active material layer 120 disposed on at least one side of the positive current collector 110. The positive current collector 110 includes a positive body portion 111 and at least one positive tab 112 disposed at one end of the positive body portion 111. With reference to FIG. 3 and FIG. 4, the negative electrode plate 200 includes a negative current collector 210 and a negative active material layer 220 disposed on at least one side of the negative current collector 210. The negative current collector 210 includes a negative body portion 211 and at least one negative tab 212 disposed at one end of the negative body portion 211. In this embodiment, as shown in FIG. 6, a wound battery cell 300 is provided. The battery cell 300 may alternatively be a laminated type, which can be set as required and is not limited in this application.

With reference to FIG. 1 to FIG. 4, a width of a root of each positive tab 112 along the MD direction is m1, measured in mm; and a width of a root of each negative tab 212 along the MD direction is m2, measured in mm. A thickness of the root of each positive tab 112 is d1, and a thickness of the root of each negative tab 212 is d2, measured in mm. Along the MD direction, a distance between central axes M of two adjacent positive tabs is b1, and a distance between central axes N of two adjacent negative tabs is b2, measured in mm. A conductivity of the positive current collector 110 is S1, and a conductivity of the negative current collector 210 is S2, measured in S/m. A width of the positive active material layer 120 along the TD direction is a1, and a width of the negative active material layer 220 along the TD direction is a2, measured in mm. A mass per unit area of the positive active material layer 120 is CW1, and a mass per unit area of the negative active material layer 220 is CW2, measured in g/1540.25 mm².

A design parameter of each positive tab 112 is Fc, where $$Fc = \frac{m1 \times d1 \times S1}{CW1 \times a1 \times b1},$$

and a design parameter of each negative tab 212 is Fa, where $$Fa = \frac{m2 \times d2 \times S2}{CW2 \times a2 \times b2},$$

measured in 15.4025 S·mm·g⁻¹. A value of Fc satisfies Fc≥0.1, and/or a value of Fa satisfies Fa≥0.02.

In this embodiments, size specifications of each positive tab 112 and each negative tab 212 as well as a distribution design of the positive tab 112 in the positive electrode plate 100 and a distribution design of the negative tab 212 in the negative electrode plate 200 are adjusted according to the design parameters of each positive tab 112 and each negative tab 212, thereby ensuring that a local temperature rise of the battery cell 300 in a fixed charging process does not exceed a threshold on the premise of increasing the volumetric energy density of the battery cell 300.

In some embodiments, m1≥0.02 mm; d1≤0.02 mm; b1<0.6 mm; S1≥30 S/m; a1≤0.3 mm; 0.35 g/1540.25 mm²≤CW1≤0.5 g/1540.25 mm²; 0.02 mm≤m2≤0.2 mm; 0.003 mm≤d2≤0.01 mm; 0.1 mm≤b2≤0.6 mm; and 50 S/m≤S2≤70 S/m; 0.05 mm ≤a2≤0.3 mm; and 0.15 g/1540.25 mm²≤CW2≤0.25 g/1540.25 mm².

Through experiments, The applicant of this disclosure determines the further optimized value ranges of various parameters of the positive tab 112, the positive active material layer 120, the positive current collector 110, the negative tab 212, the negative active material layer 220 and the negative current collector 210 on the premise of increasing the volumetric energy density (such as 300 Wh/L) of the battery cell 300 and ensuring that a local temperature rise of the battery cell 300 in a fixed charging process does not exceed a threshold (such as 60° C.). And within the above value ranges, the stability of product performance of the battery cell 300 is ensured.

In some embodiments, the battery cell 300 is a lithium iron phosphate secondary battery. The volumetric energy density of the battery cell 300 is ≥300 Wh/L. After the battery cell 300 is charged at a rate of 3 C at a room temperature for 6 min, maximum temperatures of the root of the positive tab 112 and the root of the negative tab 212 of the battery cell 300 are ≤60° C.

In these embodiments, the positive tab 112 and the negative tab 212 of the lithium iron phosphate secondary battery are designed, which can effectively increase the volumetric energy density of the battery cell to 300 Wh/L, and ensure that a local temperature rise of the battery cell in a fixed charging process does not exceed 60° C.

Figure 7:
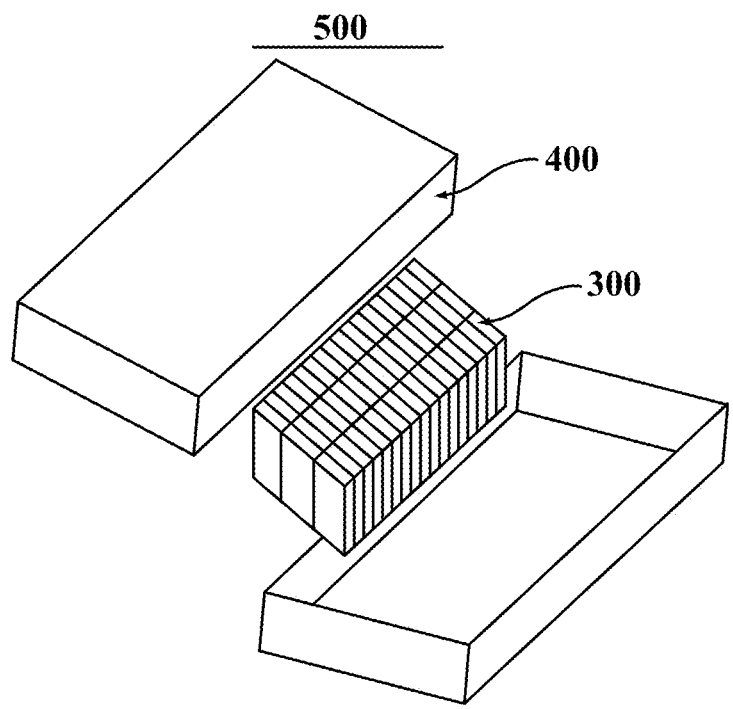
FIG. 7 is a schematic structural diagram of a battery provided in some embodiments of this application.

Reference is made to FIG. 7, where FIG. 7 is a schematic structural diagram of a battery provided in this application.

Referring to FIG. 7, this application provides a battery 500, including a box 400 and a plurality of battery cells 300 located in the box 400. The battery 500 may further include a box 400 configured to provide an accommodating space for the battery cells 300. The box 400 may be in a variety of shapes. In the battery 500, the plurality of battery cells 300 may be connected in series, parallel, or series-parallel, where being connected in series-parallel means a combination of series connection and parallel connection of the plurality of battery cells 300. The plurality of battery cells 300 may be directly connected in series, parallel, or series-parallel, and then an entirety of the plurality of battery cells 300 is accommodated in the box 400. Certainly, the battery 500 may alternatively be formed in a manner that a plurality of battery cells 300 are connected in series, parallel, or series-parallel first to form a battery module and then a plurality of battery modules are connected in series, parallel, or series-parallel to form an entirety which is accommodated in the box 400. The battery 500 may further include other structures. For example, the battery 500 may further include a busbar component configured to implement electrical connection between the plurality of battery cells 300. Each battery cell 300 may be a secondary battery or a primary battery, or may be a lithium-sulfur battery, a sodium-ion battery, or a magnesium-ion battery, without being limited thereto. The battery cells 300 may be cylindrical, flat, cuboid, or of other shapes, without being limited thereto.

Figure 8:
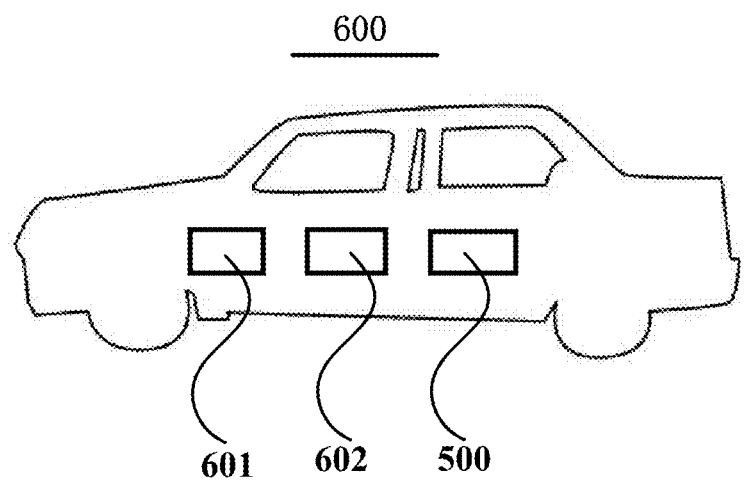
FIG. 8 is a schematic structural diagram of an electric apparatus provided in some embodiments of this application.

Reference is made to FIG. 8, where FIG. 8 is a structure schematic diagram of an electric apparatus provided in this application.

Referring to FIG. 8, this application provides an electric apparatus including the foregoing battery 500. The electric apparatus may be a mobile phone, a computer, an electric motorcycle, an electric vehicle 600, or the like. In this embodiment, the electric vehicle 600 is used as example for description. The electric vehicle 600 is provided with a battery 500 inside, and the battery 500 may be disposed at the bottom, front, or rear of the electric vehicle 600. The battery 500 may be configured to supply power to the electric vehicle 600. For example, the battery 500 may be used as an operational power source for the electric vehicle 600. The electric vehicle 600 may further include a controller 601 and a motor 602, where the controller 601 is configured to control the battery 500 to supply power to the motor 602, for example, to satisfy power needs of start, navigation, and driving of the electric vehicle 600. In some embodiments of this application, the battery 500 can be used as the operational power source for the electric vehicle 600 as well as a driving power source for the electric vehicle 600 to provide driving traction for the electric vehicle 600.

In this application, a battery cell 300 is formed by the provided positive electrode plate 100, negative electrode plate 200 and separator through a conventional formation method (for example, a method such as winding or folding). Temperature sensing wires are arranged at the roots of the positive tab 112 and negative tab 212 in the battery cell 300. The assembled battery cell 300 is placed in a normal-temperature environment and is charged at 3 C for 6 min, and temperatures of the roots of the positive tab 112 and negative tab 212 in the battery cell 300 are monitored in real time.

Embodiments 1 to 30 and Comparative Embodiments 1 to 6 for contrast are provided according to difference between the design parameter of the positive tab 112 and the design parameter of the negative tab 212. Parameter settings and test results of the embodiments and the comparative embodiments are shown in Table 1.

TABLE 1

Parameter settings and test results of battery cells in embodiments of this application

| Item | $\varphi c$ | $\varphi a$ | Fc | Fa | Volumetric energy density | Maximum temperature at root of positive tab | Maximum temperature at root of negative tab |
| --- | --- | --- | --- | --- | --- | --- | --- |
| Comparative Embodiment 1 | 11 | 11 | 0.01 | 0.01 | 270 Wh/L | 65° C. | 63° C. |
| Comparative Embodiment 2 | 40 | 60 | 0.01 | 0.01 | 420 Wh/L | 74° C. | 75° C. |
| Comparative Embodiment 3 | 60 | 90 | 0.3 | 0.05 | 500 Wh/L | 70° C. | 65° C. |
| Comparative embodiment 4 | 17 | 11 | 0.4 | 0.1 | 282 Wh/L | 43° C. | 37° C. |
| Comparative Embodiment 5 | 11 | 15 | 0.4 | 0.1 | 278 Wh/L | 40° C. | 40° C. |
| Comparative Embodiment 6 | 60 | 15 | 0.4 | 0.1 | 500 Wh/L | 78° C. | 40° C. |
| Embodiment 1 | 40 | 60 | 0.1 | 0.01 | 420 Wh/L | 60° C. | 75° C. |
| Embodiment 2 | 40 | 60 | 0.4 | 0.01 | 420 Wh/L | 56° C. | 75° C. |
| Embodiment 3 | 40 | 60 | 2 | 0.01 | 420 Wh/L | 52° C. | 75° C. |
| Embodiment 4 | 40 | 60 | 10 | 0.01 | 420 Wh/L | 50° C. | 75° C. |
| Embodiment 5 | 40 | 60 | 15 | 0.01 | 420 Wh/L | 46° C. | 75° C. |
| Embodiment 6 | 40 | 60 | 25 | 0.01 | 420 Wh/L | 43° C. | 75° C. |
| Embodiment 7 | 40 | 60 | 30 | 0.01 | 420 Wh/L | 42° C. | 75° C. |
| Embodiment 8 | 40 | 60 | 75 | 0.01 | 420 Wh/L | 40° C. | 75° C. |
| Embodiment 9 | 40 | 60 | 0.05 | 0.02 | 420 Wh/L | 73° C. | 60° C. |
| Embodiment 10 | 40 | 60 | 0.05 | 0.1 | 420 Wh/L | 73° C. | 55° C. |
| Embodiment 11 | 40 | 60 | 0.05 | 10 | 420 Wh/L | 73° C. | 52° C. |
| Embodiment 12 | 40 | 60 | 0.05 | 30 | 420 Wh/L | 73° C. | 44° C. |
| Embodiment 13 | 40 | 60 | 0.05 | 40 | 420 Wh/L | 73° C. | 38° C. |
| Embodiment 14 | 40 | 60 | 0.05 | 70 | 420 Wh/L | 73° C. | 34° C. |
| Embodiment 15 | 17 | 15 | 0.4 | 0.1 | 310 Wh/L | 43° C. | 37° C. |
| Embodiment 16 | 17 | 30 | 0.4 | 0.1 | 308 Wh/L | 43° C. | 38° C. |
| Embodiment 17 | 17 | 45 | 0.4 | 0.1 | 306 Wh/L | 43° C. | 39° C. |
| Embodiment 18 | 17 | 60 | 0.4 | 0.1 | 303 Wh/L | 43° C. | 40° C. |
| Embodiment 19 | 17 | 85 | 0.4 | 0.1 | 301 Wh/L | 43° C. | 41° C. |
| Embodiment 20 | 17 | 95 | 0.4 | 0.1 | 300 Wh/L | 43° C. | 41° C. |
| Embodiment 21 | 17 | 15 | 75 | 80 | 303 Wh/L | 30° C. | 31° C. |
| Embodiment 22 | 22 | 15 | 0.4 | 0.1 | 305 Wh/L | 46° C. | 40° C. |
| Embodiment 23 | 30 | 15 | 0.4 | 0.1 | 360 Wh/L | 51° C. | 40° C. |
| Embodiment 24 | 40 | 15 | 0.4 | 0.1 | 420 Wh/L | 54° C. | 40° C. |
| Embodiment 25 | 50 | 15 | 0.4 | 0.1 | 480 Wh/L | 57° C. | 40° C. |
| Embodiment 26 | 50 | 85 | 0.1 | 0.02 | 480 Wh/L | 60° C. | 60° C. |
| Embodiment 27 | 50 | 85 | 0.4 | 0.1 | 480 Wh/L | 56° C. | 58° C. |

TABLE 1-continued

Parameter settings and test results of battery cells in embodiments of this application

| Item | φc | φa | Fc | Fa | Volumetric energy density | Maximum temperature at root of positive tab | Maximum temperature at root of negative tab |
|---|---|---|---|---|---|---|---|
| Embodiment 28 | 50 | 85 | 20 | 45 | 480 Wh/L | 53° C. | 53° C. |
| Embodiment 29 | 50 | 85 | 40 | 90 | 480 Wh/L | 51° C. | 47° C. |
| Embodiment 30 | 50 | 85 | 60 | 135 | 480 Wh/L | 48° C. | 42° C. |

Test data in Table 1 is analyzed.

(1) The test data of Comparative Embodiment 1 show that: the design parameter Fc of the positive tab, the positive electrode plate factor qc, the design parameter Fa of the negative tab, and the negative electrode plate factor pa are all less than minimum values of the respective parameters, so the volumetric energy density of the battery cell is less than 300 Wh/L, and the maximum temperature at the root of the positive tab and the maximum temperature at the root of the negative tab are both above 60° C.

(2) The test data of Contrast Document 2 show that: the positive electrode plate factor qc and the negative electrode plate factor pa are within the value ranges provided in this application, and the design parameter Fc of the positive tab and the design parameter Fa of the negative tab are both less than their respective minimum values, so the volumetric energy density of the battery cell is greater than 300 Wh/L, and the maximum temperature at the root of the positive tab and the maximum temperature at the root of the negative tab are both above 60° C.

(3) The test data of Contrast Document 3 show that: the design parameter Fc of the positive tab and the design parameter Fa of the negative tab are within the value ranges provided in this application, and the positive electrode plate factor pc and the negative electrode plate factor pa are both greater than their respective maximum values, so the volumetric energy density of the battery cell is 500 Wh/L, and the maximum temperature at the root of the positive tab and the maximum temperature at the root of the negative tab are both above 60° C.

(4) The test data of Contrast Documents 4 and 5 show that: the design parameter Fc of the positive tab and the design parameter Fa of the negative tab are within the value ranges provided in this application, one of the positive electrode plate factor pc and the negative electrode plate factor pa is within the value range, and the other is less than the minimum value, so the volumetric energy density of the battery cell is less than 300 Wh/L, while the maximum temperature at the root of the positive tab and the maximum temperature at the root of the negative tab are both below 60° C.

(5) The test data of Contrast Document 6 show that: the design parameter Fc of the positive tab and the design parameter Fa of the negative tab are within the value ranges provided in this application, the positive electrode plate factor pc is beyond the value range, and the negative electrode plate factor pa is within the value range, so the volumetric energy density of the battery cell is greater than 300 Wh/L, the maximum temperature at the root of the negative tab is below 60° C., but the maximum temperature at the root of the positive tab is above 60° C.

(6) The test data of Embodiments 1 to 8 show that: the positive electrode plate factor pc and the negative electrode plate factor pa are within the value ranges provided in this application, the design parameter Fc of the positive tab is within the value range, and the design parameter Fa of the negative tab is less than the minimum value, so the volumetric energy density of the battery cell is greater than 300 Wh/L, the maximum temperature at the root of each positive tab is below 60° C., but the maximum temperature at the root of each negative tab is above 60° C.

(7) The test data of Embodiments 9 to 14 show that: the positive electrode plate factor pc and the negative electrode plate factor pa are within the value ranges provided in this application, the design parameter Fc of the positive tab is not within the value range, and the design parameter Fa of the negative tab is within the value range, so the volumetric energy density of the battery cell is greater than 300 Wh/L, the maximum temperature at the root of each positive tab is above 60° C., but the maximum temperature at the root of each negative tab is not above 60° C.

(8) The test data of Embodiments 9 to 14 show that: the positive electrode plate factor pc and the negative electrode plate factor pa are within the value ranges provided in this application, the design parameter Fc of the positive tab is not within the value range, and the design parameter Fa of the negative tab is within the value range, so the volumetric energy density of the battery cell is greater than 300 Wh/L, the maximum temperature at the root of each positive tab is above 60° C., but the maximum temperature at the root of each negative tab is not above 60° C.

(9) The test data of Embodiments 15 to 30 show that: the design parameter Fc of the positive tab, the positive electrode plate factor qc, the design parameter Fa of the negative tab, and the negative electrode plate factor pa are within the value ranges provided in this application, so the volumetric energy densities of the battery cells are all greater than 300 Wh/L, and the maximum temperature at the root of each positive tab and the maximum temperature at the root of each negative tab are both not above 60° C. The test data of Embodiments 15 to 20 show that the positive electrode plate factor qc remains unchanged, the negative electrode plate factor pa increases gradually, and the volumetric energy density of each battery cell decreases gradually. The test data of Embodiments 21 to 25 show that the negative electrode plate factor pa remains unchanged, the positive electrode plate factor pc increases gradually, and the volumetric energy density of each battery cell increases gradually. The test data of Embodiments 26 to 30 show that the negative electrode plate factor pa and the positive electrode plate factor qc are both the maximum values, the volumetric energy density of each battery cell remains unchanged, and the maximum temperature at the root of each positive tab and the maximum temperature at the root of each negative tab both decrease gradually when the values of the positive electrode plate factor pc and the negative electrode plate factor pa increase gradually.

In the several embodiments provided in this application, it should be understood that the disclosed system, apparatus, and method may be implemented in other manners. For example, the described apparatus embodiments are merely illustrative. For example, the unit division is merely logical function division and other division manners may be used in actual implementation. For example, a plurality of units or components may be combined or integrated into another system, or some features may be ignored or not be performed.

In addition, the functional units in the embodiments of this application may be integrated into one processing unit, the units may each physically exist alone, or two or more units may be integrated into one unit. The foregoing integrated units may be implemented in the form of hardware or implemented in the form of software functional units.

In conclusion, it should be noted that the foregoing embodiments are merely for describing the technical solutions of this application rather than for limiting this application. Although this application has been described in detail with reference to the foregoing embodiments, a person of ordinary skill in the art should appreciate that they can still make modifications to the technical solutions described in the foregoing embodiments or make equivalent replacements to some or all technical features thereof. However, these modifications or replacements do not cause the essence of the corresponding technical solutions to depart from the scope of the technical solutions of the embodiments of this application, and shall all fall within the scope of the claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A positive electrode plate, comprising:
   a positive current collector; and
   a positive active material layer disposed on at least one side of the positive current collector, wherein the positive current collector comprises a positive body portion and at least one positive tab disposed at one end of the positive body portion;
   wherein a width of a root of each positive tab along a machine direction (MD) is m1, measured in mm; a thickness of the root of each positive tab is d1, measured in mm; along the MD, a distance between central axes of two adjacent positive tabs is b1, measured in mm; a conductivity of the positive current collector is S1, measured in S/m; a width of the positive active material layer along a transverse direction (TD) is a1, measured in mm; a mass per unit area of the positive active material layer is CW1, measured in g/1540.25 mm$^2$; and
   wherein a design parameter of each positive tab is Fc, where $$Fc = \frac{m1 \times d1 \times S1}{CW1 \times a1 \times b1},$$

measured in 15.4025S·mm·g$^{-1}$, and a value of Fc satisfies Fc≥0.1.

2. The positive electrode plate according to claim 1, wherein the value of the design parameter of each positive tab satisfies Fc≥0.4.

3. The positive electrode plate according to claim 1, wherein a ratio of a mass per unit area of the positive active material layer to a thickness of the positive current collector is taken as a positive electrode plate factor φc, and a value of the positive electrode plate factor satisfies 17≤φc≤50, wherein φc represents the positive electrode plate factor, measured in g/1540.25 mm$^3$.

4. The positive electrode plate according to claim 1, wherein m1≥0.02 mm; and/or d1≤0.02 mm; and/or b1≤0.6 mm; and/or S1≥30 S/m; and/or a1≤0.3 mm; and/or 0.35 g/1540.25 mm$^2$≤CW1≤0.5 g/1540.25 mm$^2$.

5. The positive electrode plate according to claim 1, wherein the positive active material layer comprises a lithium iron phosphate material.

6. A negative electrode plate, comprising:
   a negative current collector; and
   a negative active material layer disposed on at least one side of the negative current collector, wherein the negative current collector comprises a negative body portion and at least one negative tab disposed at one end of the negative body portion;
   wherein a width of a root of each negative tab along a machine direction (MD) is m2, measured in mm; a thickness of the root of each negative tab is d2, measured in mm; along the MD direction, a distance between central axes of two adjacent negative tabs is b2, measured in mm; a conductivity of the negative current collector is S2, measured in S/m; a width of the negative active material layer along a transverse direction (TD) is a2, measured in mm; a mass per unit area of the negative active material layer is CW2, measured in g/1540.25 mm$^2$; and
   wherein a design parameter of each negative tab is Fa, where $$Fa = \frac{m2 \times d2 \times S2}{CW2 \times a2 \times b2},$$

measured in 15.4025S·mm·g$^{-1}$, and a value of Fa satisfies Fa≥0.02.

7. The negative electrode plate according to claim 6, wherein the value of the design parameter of each negative tab satisfies Fa≥0.1.

8. The negative electrode plate according to claim 6, wherein a ratio of a mass per unit area of the negative active material layer to a thickness of the negative current collector is taken as a negative electrode plate factor φa, and a value of the negative electrode plate factor satisfies 15≤φa≤85, wherein φa represents the negative electrode plate factor, measured in g/1540.25 mm$^3$.

9. The negative electrode plate according to claim 6, wherein 0.02 mm≤m2≤0.2 mm; and/or 0.003 mm≤d2≤0.01 mm; and/or 0.1 mm≤b2<0.6 mm; and/or 50 S/m≤S2≤70 S/m; and/or 0.05 mm≤a2≤0.3 mm; and/or 0.15 g/1540.25 mm$^2$≤CW2≤0.25 g/1540.25 mm$^2$.

10. A battery cell, comprising at least one selected from a positive electrode plate, a negative electrode plate, or both, wherein the positive electrode plate comprises:
    a positive current collector; and
    a positive active material layer disposed on at least one side of the positive current collector, wherein the positive current collector comprises a positive body portion and at least one positive tab disposed at one end of the positive body portion, wherein a width of a root of each positive tab along a machine direction (MD) is m1, measured in mm; a thickness of the root of each positive tab is d1, measured in mm; along the MD direction, a distance between central axes of two adjacent positive tabs is b1, measured in mm; a conductivity of the positive current collector is S1, measured in S/m; a width of the positive active material layer along a transverse direction (TD) is a1, measured in mm; a mass per unit area of the positive active material layer is CW1, measured in g/1540.25 mm², wherein a first design parameter of each positive tab is Fc, where $$Fc = \frac{m1 \times d1 \times S1}{CW1 \times a1 \times b1},$$

measured in 15.4025S·mm·g⁻¹, and a value of Fc satisfies Fc≥0.1;

wherein the negative electrode plate comprises:
  a negative current collector; and
  a negative active material layer disposed on at least one side of the negative current collector, wherein the negative current collector comprises a negative body portion and at least one negative tab disposed at one end of the negative body portion, wherein a width of a root of each negative tab along a machine direction (MD) is m2, measured in mm; a thickness of the root of each negative tab is d2, measured in mm; along the MD direction, a distance between central axes of two adjacent negative tabs is b2, measured in mm; a conductivity of the negative current collector is S2, measured in S/m; a width of the negative active material layer along a transverse direction (TD) is a2, measured in mm; a mass per unit area of the negative active material layer is CW2, measured in g/1540.25 mm², wherein a second design parameter of each negative tab is Fa, where $$Fa = \frac{m2 \times d2 \times S2}{CW2 \times a2 \times b2},$$

measured in 15.4025S·mm·g⁻¹, and a value of Fa satisfies Fa≥0.02.

11. The battery cell according to claim 10, wherein the battery cell is a lithium iron phosphate secondary battery, wherein a volumetric energy density of the battery cell is ≥300 Wh/L, and after the battery cell is charged at a rate of 3 C at a room temperature for 6 min, maximum temperatures of the root of the positive tab and the root of the negative tab of the battery cell are ≤60° C.

12. A battery, comprising a box and a plurality of battery cells according to claim 10, wherein the battery cells are located in the box.

13. An electric apparatus, comprising the battery according to claim 12.

14. The battery cell according to claim 10, wherein the value of the first design parameter of each positive tab satisfies Fc≥0.4.

15. The battery cell according to claim 10, wherein a ratio of a mass per unit area of the positive active material layer to a thickness of the positive current collector is taken as a positive electrode plate factor φc, and a value of the positive electrode plate factor satisfies 17≤φc≤50, wherein φc represents the positive electrode plate factor, measured in g/1540.25 mm³.

16. The battery cell according to claim 10, wherein m1≥0.02 mm; and/or d1≤0.02 mm; and/or b1≤0.6 mm; and/or S1 ≥30 S/m; and/or a1≤0.3 mm; and/or 0.35 g/1540.25 mm²≤CW1≤0.5 g/1540.25 mm².

17. The battery cell according to claim 10, wherein the positive active material layer comprises a lithium iron phosphate material.

18. The battery cell according to claim 10, wherein the value of the second design parameter of each negative tab satisfies Fa≤0.1.

\* \* \* \* \*